Feb. 25, 1930.  T. PETERSEN  1,748,459

DIE STOCK

Filed Aug. 6, 1924

Inventor
Thorvald Petersen
By
Attorney

Patented Feb. 25, 1930

1,748,459

UNITED STATES PATENT OFFICE

THORVALD PETERSEN, OF ERIE, PENNSYLVANIA, ASSIGNOR TO REED MANUFACTURING COMPANY, OF ERIE, PENNSYLVANIA, A CORPORATION OF PENNSYLVANIA

DIESTOCK

Application filed August 6, 1924. Serial No. 730,439.

Die stocks are usually provided with a seat for the die and with a main plate for holding the die in the seat. This is particularly true of the solid die head. To remove or change the die it has been customary to have a large plate with a slotted opening which could be swung over the die and clamped by means of a screw operating in the slotted opening. This is an inconvenient construction and one requiring some time in its operation. The present invention is designed to improve the clamping or securing means for dies in die stocks.

The invention is illustrated in the accompanying drawings as follows:—

Figure 1:
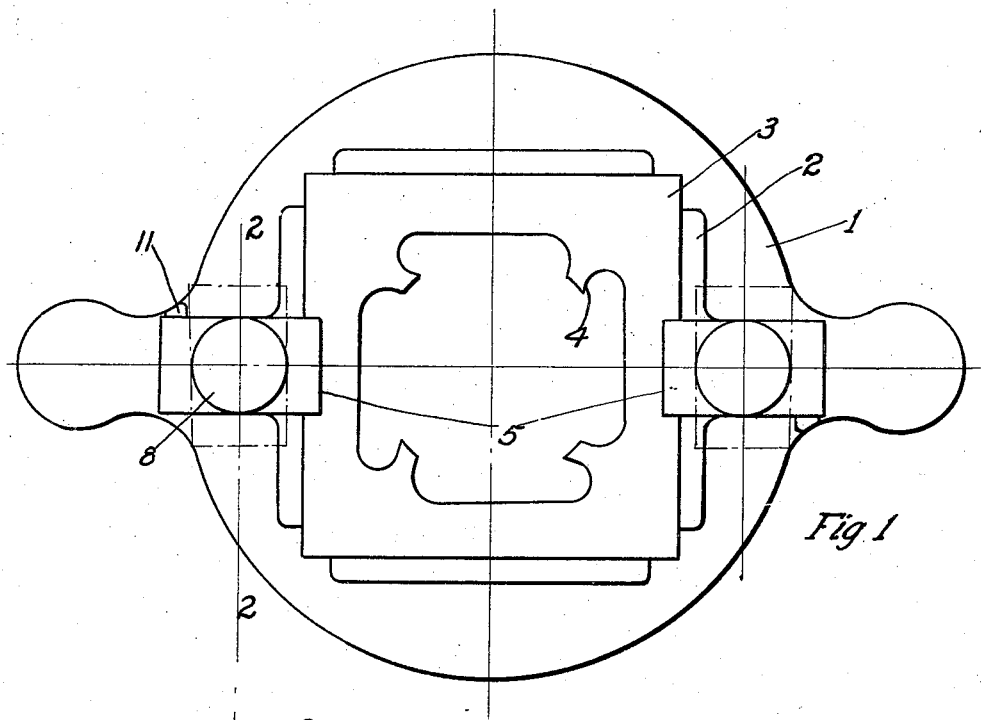

Fig. 1 shows a face view of a die stock.

Figure 2:
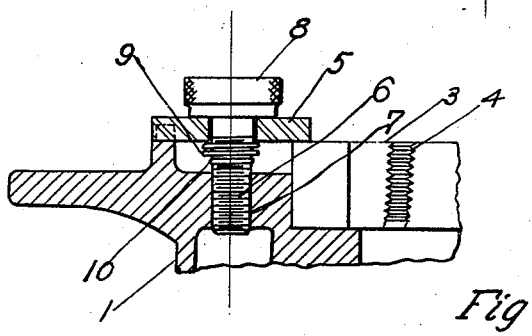

Fig. 2 a section on the line 2—2 in Fig. 1.

1 marks the head, and 2 the guide plates forming the seat for the die 3, the die having the usual cutting faces 4.

Clamping plates 5 are arranged at opposite sides of the die. These are mounted on screws 6 which are secured in the screw-threaded opening 7 in the head. The screws have the nurled heads 8.

The screws are so arranged and the plates so positioned and of such size that when the plates are turned in one direction as shown in Fig. 1 the ends of the plates overlap the die and by setting down the screw the die is clamped in place. When the plate is turned a quarter turn as shown in dash lines in Fig. 1 it is removed from the die so that the die can be readily removed.

In order to facilitate this movement I have the plate frictionally secured to the screw so that as the screw is turned the plate turns with it. To accomplish this a spring 9 is mounted on the screw, some of the wraps of the spring being free from the screw so as to exert pressure on the plate and the final wrap of the spring 10 being slightly smaller than the screw so that it is assembled by screwing the screw into the final wrap 10, thus holding the spring in place.

A stop 11 is positioned to engage the plate 5 when turned in either direction. When the screw is turned to the right so as to tighten it the stop 11 will engage the plate in position to overlap the die and clamp it. When the screw is loosened or turned to the left as soon as the clamping plate is released from the die the frictional engagement of the spring will carry the plate around to a position against the stop 11, which will be the dash position as shown in Fig. 1. When a new die is in place all that is necessary is to turn the screw in the direction to tighten it and the plate is again swung into position over the die and clamped with the same turning movement.

What I claim as new is:—

1. In a die stock, the combination of a head having a die seat therein; a clamping plate; a rotative screw on which the plate is mounted, said clamping plate having dimensions clearing the die when swung to one position and extending over the die when swung to another position, said screw having frictional engagement with the plate and moving the plate into and out of engagement with a die on the seat as the screw is turned; and a stop limiting the swinging movement of the plate to position the plate on and off the die.

2. In a die stock, the combination of a head having a die seat therein; a clamping plate; a rotative screw on which the plate is mounted, said clamping plate having dimensions clearing the die when swung to one position and extending over the die when swung to another position, said screw having frictional engagement with the plate and moving the plate into and out of engagement with a die on the seat as the screw is turned, the turning of the screw in a tightening direction swinging the plate into engagement and clamping the same and the turning of the screw in a loosening direction loosening the plate and turning the same out of engagement with a die; and a stop limiting the swinging movement of the plate to position the plate on and off the die.

In testimony whereof I have hereunto set my hand.

THORVALD PETERSEN.